United States Patent
Nagai et al.

(10) Patent No.: US 6,458,352 B2
(45) Date of Patent: Oct. 1, 2002

(54) ORGANIC CONTROLLER AND METHOD FOR PRODUCING THE SAME

(76) Inventors: Kazuhiro Nagai, 3-13-205, Takasu 3-Chome, Niski-Ku, Hiroshima-Shi, Hiroshima (JP); Masachika Hirose, 2-1-16, Nakajimahigashi, Oita-shi, Oita (JP)

( * ) Notice: Subject to any disclaimer, the term of this patent is extended or adjusted under 35 U.S.C. 154(b) by 0 days.

(21) Appl. No.: 09/767,412

(22) Filed: Jan. 23, 2001

(30) Foreign Application Priority Data

Jan. 28, 2000 (JP) ........................................ 2000-019576

(51) Int. Cl.⁷ ................................................ A61K 38/44
(52) U.S. Cl. .................... 424/94.4; 424/94.1; 424/94.2; 424/725
(58) Field of Search ............................. 424/94.1, 94.2, 424/725, 729, 94.5, 725 G, 94.4

(56) References Cited

U.S. PATENT DOCUMENTS

| | | | | |
|---|---|---|---|---|
| 4,824,589 A | * | 4/1989 | Magyar et al. | |
| 5,164,376 A | * | 11/1992 | Hsu et al. | |
| 5,302,321 A | * | 4/1994 | Akama et al. | |
| 5,332,516 A | * | 7/1994 | Stephens | |
| 5,587,171 A | * | 12/1996 | N'Guyen | |
| 5,667,791 A | * | 9/1997 | Hersh et al. | |
| 5,700,782 A | * | 12/1997 | Cope et al. | |
| 5,948,443 A | * | 9/1999 | Riley et al. | |
| 6,054,128 A | * | 4/2000 | Wakat | |

FOREIGN PATENT DOCUMENTS

| | | |
|---|---|---|
| JP | 49-47263 | 5/1974 |
| JP | 49-58084 | 6/1974 |
| JP | 60-186581 | 9/1985 |

* cited by examiner

Primary Examiner—Leon B. Lankford, Jr.
Assistant Examiner—Ruth Davis
(74) Attorney, Agent, or Firm—Trask Britt, PC

(57) ABSTRACT

The present invention relates to an organic controller capable of controlling redox reaction at a low cost in a simple manner, the organic controller comprising a combination of two or more substances selected from vitamins and vitamin-like substances, a combination of one or more substances selected from vitamins and vitamin-like substances and one or more substances selected from polyphenols, a combination of one or more substances selected from vitamins and vitamin-like substances and one or more substances selected from enzymes, or a combination of one or more substances selected from vitamins and vitamin-like substances, one or more substances selected from polyphenols and one or more substances selected from enzymes, as the effective component.

8 Claims, No Drawings

ORGANIC CONTROLLER AND METHOD FOR PRODUCING THE SAME

BACKGROUND OF THE INVENTION

1. Field of the Invention

The present invention relates to an organic controller controlling oxidation and a method for producing the same.

2. Description of Prior Art

Conventionally, oxidation control is carried out by a method for chemically controlling redox reaction. For example, pH controller (redox agent) is used for liquid waste disposal. So as to prevent the oxidation of metal surface, rust proof agents are coated or an electro-chemical rust proof method is carried out. However, due to the dependency of oxidation on the surface morphology of a substance to be oxidized and the reduction of the effect of chemical agents against oxidation because of the deterioration of the chemical agents, these methods cannot completely stop such reaction, although these methods are effective for the suppression of oxidation.

As disclosed in Japanese Patent Publication (Koukoku) No. 63593/1991, however, active blends containing divalent and trivalent iron salts have interesting actions, such as biologically active actions and ionization-suppressing actions. Such active blends are produced by step 1 of charging and dissolving ferric chloride in aqueous caustic soda solution, step 2 of neutralizing the solution with hydrochloric acid, step 3 of concentrating the neutralized solution to recover a crystal, step 4 of dissolving the crystal in a mixture solution of alcohol and water and recover a crystal by filtering the mixtured solution and concentrated it, and step 5 of mixing the crystal with sodium chloride. The active blends thus produced exert an effect singly or in the form of a complex in combination with additives such as aluminum, sodium chloride, magnesium chloride, plant fiber and protein on the suppression of oxidation at a level almost equal to the level by the conventional method comprising chemically controlling oxidation.

Disadvantageously, however, the method for producing active blends containing the divalent and trivalent iron salts requires complicated procedures and additionally involves very poor yield of the resulting blends. As described above, additionally, very long time and very tedious procedures are needed for the application of the active blends to water treatment such as liquid waste disposal. Therefore, the method is disadvantageous in that the cost of water treatment is higher than the cost by the method comprising chemical procedures.

The present invention has been achieved in such circumstances. It is a purpose of the present invention to provide an organic controller capable of controlling redox reaction at low cost and in a simple manner and a method for producing the same.

SUMMARY OF THE INVENTION

The present invention relates to an organic controller capable of controlling redox reaction and a method for producing the same. The purpose of the present invention can be achieved by using a combination of two or more substances selected from vitamins and vitamin-like substances as the effective component of the organic controller. Additionally, the invention is also achieved by using as the effective component of the organic controller a combination of one or more substances selected from vitamins and vitamin-like substances and one or more substances selected from polyphenols; a combination of one or more substances selected from vitamins and vitamin-like substances and one or more substances selected from enzymes; or a combination of one or more substances selected from vitamins and vitamin-like substances, one or more substances selected from polyphenols and one or more substances selected from enzymes. In these cases, the vitamins and vitamin-like substances are selected from vitamin A, vitamin B1, vitamin B2, vitamin B3, vitamin B5, vitamin B6, vitamin B12, vitamin B15, vitamin B17, vitamin C, vitamin D, vitamin E, vitamin F, vitamin K, vitamin P, biotin, folic acid, beta-carotene, inositol, choline and Coenzyme Q; the polyphenols are selected from catechin, epicatechin, gallocatechin, epigallocatechin, epicatechin gallate, and epigallocatechin gallate; and the enzymes are selected from superoxide dismutase, catalase and glutathione peroxidase.

The purpose of the present invention is achieved by a method for producing an organic controller, comprising dissolving two or more substances selected from vitamins and vitamin-like substances separately in appropriate solvents, diluting the resulting individual solutions in water and mixing together the individual aqueous dilute solutions at an appropriate ratio and subsequently diluting the resulting mixture solution. The purpose of the present invention is also achieved by dissolving one or more substances selected from vitamins and vitamin-like substances and one or more substances selected from polyphenols, separately in appropriate solvents, diluting the resulting individual solutions in water, and mixing together the individual aqueous dilute solutions at an appropriate ratio and subsequently diluting the resulting mixture solution, or by dissolving one or more substances selected from vitamins and vitamin-like substances and one or more substances selected from enzymes separately in appropriate solvents, diluting the resulting individual solutions in water, and mixing together the individual aqueous dilute solutions at an appropriate ratio and subsequently diluting the resulting mixture solution, or by dissolving one or more substances selected from vitamins and vitamin-like substances, one or more substances selected from polyphenols and one or more substances selected from enzymes, separately in appropriate solvents, diluting the resulting individual solutions in water, and mixing together the individual aqueous dilute solutions at an appropriate ratio and subsequently diluting the resulting mixture solution. In these cases, effectively, the vitamins and vitamin-like substances are selected from vitamin A, vitamin B1, vitamin B2, vitamin B3, vitamin B5, vitamin B6, vitamin B12, vitamin B15, vitamin B17, vitamin C, vitamin D, vitamin E, vitamin F, vitamin K, vitamin P, biotin, folic acid, beta-carotene, inositol, choline and Coenzyme Q; the polyphenols are selected from catechin, epicatechin, gallocatechin, epigallocatechin, epicatechin gallate, and epigallocatechin gallate; and the enzymes are selected from superoxide dismutase, catalase and glutathione peroxidase.

DETAILED DESCRIPTION OF THE PREFERRED EMBODIMENTS

The present invention will now be described in embodiments. The substance for use in the production of the organic controller according to the present invention is selected from the following 4 groups: 1. two or more substances selected from vitamins and vitamin-like substances; 2. one or more substances selected from vitamins and vitamin-like substances and one or more substances selected from polyphenols; 3. one or more substances selected from vitamins and vitamin-like substances and one or more substances selected from enzymes; and 4. one or more substances selected from vitamins and vitamin-like substances, one or more substances selected from polyphenols, and one or more substances selected from enzymes. Herein, the vitamins and vitamin-like substances are selected from vitamin A, vitamin B1, vitamin B2, vitamin B3, vitamin B5, vitamin B6, vitamin B12, vitamin B15, vitamin B17, vitamin C, vitamin D, vitamin E, vitamin F, vitamin K, vitamin P, biotin, folic acid, beta-carotene, inositol, choline and Coenzyme Q; the polyphenols are selected from catechin, epicatechin, gallocatechin, epigallocatechin, epicatechin gallate, and epigallocatechin gallate; and the enzymes are preferably anti-oxidation enzymes and specifically include superoxide dismutase (SOD), catalase and glutathione peroxidase. The organic controller for use in accordance with the present invention is a substance controlling oxidation and may satisfactorily be in solid, liquid or gas.

In accordance with the present invention, appropriate amounts of substances selected from one of the groups described above are separately dissolved in appropriate solvents, and the amounts depend on the purpose. Any solvent capable of dissolving the compounds can be used, with no specific limitation. The solvent is preferably water and organic solvents such as ethanol and acetic acid, from the respects of ready availability, ready handleability and influences on humans. Individual substances dissolved in appropriate solvents are further diluted with water. The resulting individual aqueous dilute solutions are mixed together at an appropriate ratio. The aqueous mixture solution is additionally diluted with water, to final appropriate concentrations of all or one of the dissolved components for the suppression of oxidation. The aqueous dilute solution thus adjusted is used as an organic controller for the control of redox reaction. Specifically, the aqueous dilute solution is used in diverse utilities such as rinse agent for flush toilet, agent for preserving the freshness of plants, preservative, liquid waste disposal agent, soil modifier, ionization suppressant, rust proof agent, culturing procedure, and fish cultivation.

During the course of producing the organic controller, the amount of a substance to be dissolved in a solvent is determined, depending on the type of the substance, the purpose of the use of the organic controller or the like. Additionally, the mix ratio of the individual aqueous solutions is determined, depending on the purpose of the use of the organic controller.

During the production of the organic controller, the vitamins and the vitamin-like substances, the polyphenols and the anti-oxidation enzymes suppress the generation of active oxygen in aqueous solution, so these substances function to suppress oxidation. A combination of the aforementioned four groups is the most preferable as a combination of raw materials for the production of the organic controller, using the properties of the individual substances.

EXAMPLES

The present invention will be described in detail in the following examples, but the present invention is not limited to these examples.

Example 1

Experimental Purpose

Using the group 1 as a solute, selecting three or more substances from the vitamins and vitamin-like substances and mixing together aqueous solutions prepared from the three solutes, the concentration of the aqueous mixture solution was modified variously. The aqueous solutions at various concentrations were contaminated with 3.3% by weight of sodium chloride, to prepare corrosive environment. Iron nail was put and left in these aqueous solutions for one month. The effect on the suppression of oxidation was observed.

Experimental Method

Vitamin C, vitamin E and Coenzyme Q were selected as solutes.

1. Vitamin C (10 mmol) was dissolved in water (1 liter), which was further diluted with water to 10,000 fold.
2. Vitamin E (0.1 mmol) was dissolved in water (1 liter), which was further diluted with water to 100 fold.
3. Coenzyme Q (0.1 mmol) was dissolved in water (1 liter), which was further diluted with water to 100 fold.
4. The aqueous dilute solutions 1 to 3 were mixed together at a ratio of 1:1:1.
5. The aqueous mixture solution was further diluted with water to 1,000 fold.
6. Using the aqueous dilute solution recovered above in 5, aqueous solutions of a 10-dilution series within a concentration range of each dissolved component being $1.0 \times 10^{-11}$ to $1.0 \times 10^{-12}$ mol/liter were prepared.
7. In aqueous solutions at various concentrations as prepared above in 6 was dissolved sodium chloride at a weight ratio of 3.3%, to prepare corrosive environment.
8. Iron nail was put in the individual aqueous solutions prepared as corrosive environment; the solutions were then sealed and left to stand in cold darkness for one month. As a control sample, iron nail put in aqueous 3.3% by weight of sodium chloride solution alone under sealing was prepared; the resulting solution was then left to stand in cold darkness similarly for one month.

Results

Iron nail was recovered from each sample left to stand for one month. The amount of iron rust was measured. The results are shown in Table 1.

TABLE 1

| Concentration ($\times 10^{-12}$ mol/liter) | 1.0 | 2.0 | 3.0 | 4.0 | 5.0 | 6.0 | 7.0 | 8.0 | 9.0 | 10.0 | 3.3% NaCl water |
|---|---|---|---|---|---|---|---|---|---|---|---|
| Amount of Generated iron rust (mg) | 12.5 | 18.6 | 24.0 | 2.1 | 1.2 | 0.3 | 0.3 | 8.3 | 15.9 | 20.1 | 21.2 |

As shown in Table 1, iron nail immersed only in aqueous 3.3% by weight of sodium chloride solution generated 21.2 mg iron rust. However, the amount of generated iron rust was as very small as 0.3 to 2.1 mg when the concentration of the dissolved vitamins or the vitamin-like substance was 4.0 to $7.0 \times 10^{-12}$ mol/liter, indicating the exertion of a prominent effect on the suppression of oxidation. At other concentrations, on contrast, the amount of generated iron rust was considerably large. These indicate that the effects of vitamins and vitamin-like substances on the suppression of oxidation are exerted at an optimum concentration range.

Example 2

Experimental Purpose

Using the group 1 as a solute, selecting three or more substances from the vitamins and vitamin-like substances and mixing together aqueous solutions prepared from the three solutes at a different mixing ratio of these three aqueous solutions from the ratio in Example 1, the concentration of the aqueous mixture solution was modified variously. The aqueous solutions at various concentrations were contaminated with 3.3% by weight of sodium chloride, to prepare corrosive environment. Iron nail was put and left in these aqueous solutions for two weeks. The effect on the suppression of oxidation was observed.

Experimental Method

Vitamin C, vitamin E and Coenzyme Q were selected as solutes.

1. Vitamin C (10 mmol) was dissolved in water (1 liter), which was further diluted with water to 10,000 fold.
2. Vitamin E (0.1 mmol) was dissolved in water (1 liter), which was further diluted with water to 100 fold.
3. Coenzyme Q (0.1 mmol) was dissolved in water (1 liter), which was further diluted with water to 100 fold.
4. The aqueous dilute solutions 1 to 3 were mixed together at a ratio of 0.01:1:1.
5. The aqueous mixture solution was further diluted with water to 1,000 fold.
6. The aqueous dilute solution recovered above in 5 was diluted and adjusted to a vitamin E concentration within a range of $1.0 \times 10^{-11}$ to $1.0 \times 10^{-12}$ mol/liter.
7. Among the aqueous solutions at various concentrations adjusted above in 6, the solution at a vitamin E concentration of $6.0 \times 10^{-12}$ mol/liter was defined as stock solution. To the stock solution was further added water, to a $10^n$-fold dilution (n=0 to 19).
8. In the aqueous solutions at various concentrations as prepared above in 7 was dissolved sodium chloride at a weight ratio of 3.3%, to prepare corrosive environment.
9. Iron nail was put in the individual aqueous solutions prepared as corrosive environment; the solutions were then sealed and left to stand in cold darkness for two weeks. As a control sample, iron nail put in aqueous 3.3% by weight of sodium chloride solution alone under sealing was prepared; the resulting solution was then left to stand in cold darkness similarly for two weeks.

Results

Iron nail was put in aqueous solutions of $10^n$ (n=0 to 19)-fold dilutions prepared from the stock solution at a vitamin E concentration of $6.0 \times 10^{-12}$ mol/liter, which was then left to stand for two weeks. The amount of iron rust was measured. The results are shown in Table 2.

TABLE 2

| Dilution ratio ($10^n$-fold) | 0 | 2 | 3 | 4 | 5 | 8 | 11 | 14 | 15 | 16 | 17 | 19 | 3.3% NaCl water |
|---|---|---|---|---|---|---|---|---|---|---|---|---|---|
| Amount of generated iron rust (mg) | 0.0 | 5.1 | 0.4 | 0.0 | 0.3 | 3.5 | 0.3 | 2.1 | 0.0 | 0.0 | 0.0 | 0.1 | 0.5 |

As shown in Table 2, iron nail immersed in $10^n$ (n=0 to 19)-dilutions of aqueous vitamin solution at a concentration of $6.0 \times 10^{-12}$ mol/liter generated iron rust of the same amounts as or more than the amount of iron rust when iron nail was immersed in aqueous 3.3% by weight of sodium chloride solution alone, given n=2 to 3, 5 to 8, and 11 to 14. Almost no iron rust was generated at dilute concentrations, except for these dilute concentrations. Thus, aqueous vitamin E solutions diluted at ratios, except for n=2 and 3, 5 through 8, and 11 through 14, exert an effect on the suppression of oxidation.

Example 3

Experimental Purpose

Using the group 2 as a solute and selecting two or more substances from the vitamins and vitamin-like substances, one substance was selected from the polyphenols. These three solutes were dissolved separately in appropriate solvents and diluted with water; the resulting these aqueous solutions were mixed together at an appropriate ratio; and the concentration of the aqueous mixture solution was modified variously. The aqueous solutions at various concentrations were contaminated with 3.3% by weight of sodium chloride, to prepare corrosive environment. Iron nail was put and left in these aqueous solutions for one month. The effect on the suppression of oxidation was observed.

Experimental Method

Vitamin E, Coenzyme Q and catechin were selected as solutes.

1. Vitamin E (0.1 mmol) was dissolved in water (1 liter), which was further diluted with water to 100 fold.
2. Coenzyme Q (0.1 mmol) was dissolved in water (1 liter), which was further diluted with water to 100 fold.
3. Catechin (10 mmol) was dissolved in water (1 liter), which was further diluted with water to 10,000 fold.
4. The aqueous dilute solutions 1 to 3 were mixed together at a ratio of 2:1:1.
5. The aqueous mixture solution was further diluted with water to 1,000 fold.
6. The aqueous dilute solution recovered through mixing and dilution in 5 was diluted and adjusted to a Coenzyme Q concentration within a range of $1.0 \times 10^{-10}$ to $1.0 \times 10^{-12}$ mol/liter.
7. In the aqueous solutions at various concentrations as prepared above in 6 was dissolved sodium chloride at a weight ratio of 3.3%, to prepare corrosive environment.
8. Iron nail was put in the individual aqueous solutions prepared as corrosive environment; the solutions were then sealed and left to stand in cold darkness for one month. As a control sample, iron nail put in aqueous 3.3% by weight of sodium chloride solution under sealing was prepared; the resulting solution was then left to stand in cold darkness similarly for one month.

Results

In aqueous solutions at various concentrations of Coenzyme Q was dissolved 3.3% by weight of sodium chloride; iron nail was then put in the resulting aqueous solutions, which was then left to stand for one month; the amount of iron rust was measured. The results are shown in Table 3.

TABLE 3

| Concentration ($\times 10^{-11}$ mol/liter) | 1.0 | 2.0 | 3.0 | 4.0 | 5.0 | 6.0 | 7.0 | 8.0 | 9.0 | 10.0 | 3.3% NaCl water |
|---|---|---|---|---|---|---|---|---|---|---|---|
| Amount of generated iron rust (mg) | 16.2 | 17.3 | 18.4 | 1.1 | 0.8 | 0.2 | 0.3 | 11.1 | 16.8 | 17.3 | 15.0 |

As shown in Table 3, the amount of generated iron rust was reduced at a Coenzyme Q concentration of 4.0 to $7.0 \times 10^{-11}$ mol/liter. Within the range, the effect on the suppression of oxidation is observed.

Example 4

Experimental Purpose

Using the group 3 as a solute, one substance from the vitamins and vitamin-like substances and one substance from the enzymes were selected. These two solutes were dissolved separately in appropriate solvents and diluted with water; the resulting these aqueous solutions were mixed together at an appropriate ratio; and the concentration of the aqueous mixture solution was modified variously. The aqueous solutions at various concentrations were contaminated with 3.3% by weight of sodium chloride, to prepare corrosive environment. Iron nail was put and left in these aqueous solutions for one month. The effect on the suppression of oxidation was observed.

Experimental Method

Coenzyme Q and catalase were selected as solutes.

1. Coenzyme Q (0.1 mmol) was dissolved in water (1 liter), which was further diluted with water to 100 fold.
2. Catalase (10 mmol) was dissolved in water (1 liter), which was further diluted with water to 10,000 fold.
3. The aqueous dilute solutions 1 and 2 were mixed together at a ratio of 1:1.
4. The aqueous mixture solution was further diluted with water to 1,000 fold.
5. The aqueous dilute solution recovered through mixing and dilution in 4 was diluted and adjusted to a concentration of each dissolved component within a range of $1.0 \times 10^{-9}$ to $1.0 \times 10^{-11}$ mol/liter.
6. To the aqueous solutions at various concentrations as prepared above in 5 was dissolved sodium chloride at a weight ratio of 3.3%, to prepare corrosive environment.
7. Iron nail was put in the individual aqueous solutions prepared as corrosive environment; the solutions were then sealed and left to stand in cold darkness for one month. As a control sample, iron nail in aqueous 3.3% by weight of sodium chloride solution under sealing was prepared; the resulting solution was then left to stand in cold darkness similarly for one month.

Results

In aqueous solutions at various concentrations of each dissolved component was dissolved 3.3% by weight of sodium chloride; iron nail was then put in the resulting aqueous solutions, which was then left to stand for one month; the amount of iron rust was measured. The results are shown in Table 4.

TABLE 4

| Concentration ($\times 10^{-10}$ mol/liter) | 1.0 | 2.0 | 3.0 | 4.0 | 5.0 | 6.0 | 7.0 | 8.0 | 9.0 | 10.0 | 3.3% NaCl water |
|---|---|---|---|---|---|---|---|---|---|---|---|
| Amount of generated iron rust (mg) | 12.0 | 10.1 | 0.3 | 0.3 | 0.5 | 7.4 | 10.3 | 15.6 | 12.9 | 14.8 | 11.7 |

As shown in Table 4, the amount of generated iron rust was reduced when the concentrations of Coenzyme Q and catalase were individually 3.0 to $5.0 \times 10^{-10}$ mol/liter. Within the range, the effect on the suppression of oxidation is observed. Outside the range of the concentrations, the amount of iron rust was at the same level as or higher than the amount thereof when iron nail was immersed in aqueous 3.3% by weight of sodium chloride solution alone.

Example 5

Experimental Purpose

Using the group 4 as a solute, two substances from the vitamins and vitamin-like substances, one substance from the polyphenols and one substance from the enzymes were selected. These four solutes were dissolved separately in appropriate solvents and diluted with water; the resulting these aqueous solutions were mixed together at an appropriate ratio; and the concentration of the aqueous mixture solution was modified variously. The aqueous solutions at various concentrations were contaminated with 3.3% by weight of sodium chloride, to prepare corrosive environment. Iron nail was put and left in these aqueous solutions for one month. The effect on the suppression of oxidation was observed.

Experimental Method

Vitamin E, Coenzyme Q, catechin and catalase were selected as solutes.

1. Vitamin E (0.1 mmol) was dissolved in water (1 liter), which was further diluted with water to 100 fold.
2. Coenzyme Q (0.1 mmol) was dissolved in water (1 liter), which was further diluted with water to 100 fold.
3. Catechin (10 mmol) was dissolved in water (1 liter), which was further diluted with water to 10,000 fold.

4. Catalase (10 mmol) was dissolved in water (1 liter), which was further diluted with water to 10,000 fold.
5. The aqueous dilute solutions 1 to 4 were mixed together at a ratio of 4:3:2:1.
6. The aqueous mixture solution was further diluted with water to 1,000 fold.
7. The aqueous dilute solution recovered through mixing and dilution in 6 was diluted and adjusted to a concentration of each dissolved component within a range of $1.0 \times 10^{-11}$ to $1.0 \times 10^{-12}$ mol/liter.
8. In the aqueous solutions at various concentrations as prepared above in 7 was dissolved sodium chloride at a weight ratio of 3.3%, to prepare corrosive environment.
9. Iron nail was put in the individual aqueous solutions prepared as corrosive environment; the solutions were then sealed and left to stand in cold darkness for one month. As a control sample, iron nail in aqueous 3.3% by weight of sodium chloride solution under sealing was prepared; the resulting solution was then left to stand in cold darkness similarly for one month.

Results

In aqueous solutions at various concentrations of catalase among the dissolved components was dissolved 3.3% by weight of sodium chloride; iron nail was then put in the resulting aqueous solutions, which was then left to stand for one month; the amount of iron rust was measured. The results are shown in Table 5.

TABLE 5

| Concentration ($\times 10^{-12}$ mol/liter) | 1.0 | 2.0 | 3.0 | 4.0 | 5.0 | 6.0 | 7.0 | 8.0 | 9.0 | 10.0 | 3.3% NaCl water |
|---|---|---|---|---|---|---|---|---|---|---|---|
| Amount of generated iron rust (mg) | 0.1 | 0.2 | 0.3 | 20.6 | 18.5 | 22.3 | 26.9 | 1.1 | 0.5 | 0.7 | 16.2 |

As shown in Table 5, the amount of generated iron rust was reduced when the concentration of catalase was 1.0 to $3.0 \times 10^{-12}$ mol/liter and 8.0 to $10 \times 10^{-12}$ mol/liter. Within the range, the effect on the suppression of oxidation is observed. Outside the range of the concentrations, the amount of iron rust was at the same level as or higher than the amount thereof when iron nail was immersed in aqueous 3.3% by weight of sodium chloride solution alone.

In accordance with the invention, it is possible to produce an aqueous dilute solution comprising vitamins and vitamin-like substances, an aqueous dilute solution comprising vitamins, vitamin-like substances and polyphenols, an aqueous dilute solution comprising vitamins, vitamin-like substances and enzymes, or an aqueous dilute solution comprising vitamins, vitamin-like substances, polyphenols and enzymes, these aqueous dilute solutions being capable of suppressing oxidation. Through the adjustment of the concentrations of solute components in these individual aqueous dilute solutions, the extent of the suppression of oxidation can be modified. Thus, it is required to adjust these solutions to an appropriate concentration, depending on the use. Additionally, these solutions can exert rust proof effect at a concentration lower than conventional rust proof agents, so these solutions can reduce the processing cost. As shown in the Examples, furthermore, the organic controller according to the present invention can readily be produced because of no complicated steps in the production method thereof.

What is claimed is:

1. A rust proof agent comprising the substances vitamin C, vitamin E, and Coenzyme Q, as the effective component, at the concentration ratio of 1:1:1, wherein the concentration of each of said substances is 4.0 to $8.0 \times 10^{-12}$ mol/L.

2. A rust proof agent comprising the substances vitamin E, Coenzyme Q, and catechin at a concentration ratio of 2:1:1, wherein the concentration of said coenzyme Q is 4.0 to $8.0 \times 10^{-11}$ mol/L.

3. A rust proof agent comprising the substances Coenzyme Q, and catalase, at a concentration ration of 1:1, wherein the concentration of each of said substances is 2.0 to $7.0 \times 10^{-10}$ mol/L.

4. A rust proof agent comprising the substances vitamin E, Coenzyme Q, catechin and catalase, at a concentration ratio of 4:3:2:1, wherein the concentration of said coenzyme Q is selected from the group consisting of 1.0 to $3.0 \times 10^{-12}$ mol/L and $8.0 \times 10^{-12}$ to $1.0 \times 10^{-11}$ mol/L.

5. A method for producing an organic controller which controls redox reaction, comprising dissolving two or more substances selected from vitamins and vitamin-like substances separately in solvents, further diluting the resulting solutions, mixing the individual dilute solutions and diluting the resulting mixture solution.

6. A method for producing a rust proof agent, comprising the steps of:

dissolving the substances coenzyme Q and catalase separately in solvents;

further diluting the resulting solutions;

mixing the individual dilute solutions at a ratio of 1:1; and diluting the resulting mixture solution to the concentration of each of said substance 2.0 to $7.0 \times 10^{-10}$ mol/L.

7. A method for producing a rust proof agent, comprising the steps of:

dissolving the substances vitamin E, coenzyme Q, catechin, and catalase separately in solvents;

further diluting the resulting solutions;

mixing the individual dilute solutions at a ratio of 4:3:2:1; and diluting the resulting mixture solution to the concentration of said coenzyme Q 1.0 to $3.0 \times 10^{-12}$ mol/L or $8.0 \times 10^{-12}$ to $1.0 \times 10^{-11}$ mol/L.

8. A method for producing a rust proof agent, comprising the steps of:

dissolving the substances vitamin C, vitamin E, and coenzyme Q separately in solvents;

further diluting the resulting solutions;

mixing the individual dilute solutions at a ratio of 1:1:1; and diluting the resulting mixture solution to the concentration of each of said substances 4.0 to $8.0 \times 10^{-12}$ mol/L.

* * * * *